United States Patent Office 3,734,989
Patented May 22, 1973

3,734,989
FIBER BUNDLE ASSEMBLY
Richard L. Leonard, Cary, and Donald F. Carey, Durham, N.C., assignors to the United States of America as represented by the Secretary of the Interior
No Drawing. Filed Aug. 13, 1971, Ser. No. 171,728
Int. Cl. B29d 3/00
U.S. Cl. 264—135                                    12 Claims

ABSTRACT OF THE DISCLOSURE

An improved method for forming primary high pressure seals for water equilibrated, hollow fiber membranes, wherein a solution of gelatin is used to surround the active membrane area prior to casting the high pressure seal thereon, comprises applying a secondary, elastomeric seal to the fiber membranes prior to the application of the gelatin, which secondary seal serves as an inter-fiber barrier to the passage of gelatin thus preventing the gelatin from passing to the area of the primary high pressure seal and interfering with the sealing properties thereof.

BACKGROUND OF THE INVENTION

One of the most promising techniques for the commercial desalination of saline waters, reverse osmosis is, as its name implies, the opposite of another process. Osmosis is a naturally occurring phenomenon in which solvent from a dilute solution passes through a membrane into a more concentrated solution. This flow will continue unless opposed by a pressure equal in force to the characteristic osmotic pressure of the system. In reverse osmosis, therefore, the flow of solvent is completely reversed by applying a pressure greater than osmotic to the concentrated solution. Thus, by contacting an appropriate membrane with saline water under sufficient pressure, pure water will be forced through the membrane and recovered on the opposite side.

Obviously, the key to this process is in finding a membrane which demonstrates normal osmosis with respect to the solution to be separated. Thus, reverse osmosis was not known as a method for desalinating aqueous sodium chloride solutions until late in the 1950's when it was discovered that cellulose acetate allowed the passage of water from a dilute solution to a more concentrated one while prohibiting the flow of salt. Since that time new methods of forming cellulose acetate membranes and new membrane materials have been discovered in an attempt to find a commercially acceptable membrane.

To be economical a reverse osmosis membrane must meet the requirements of adequate selectivity and water flux. Selectivity refers to the relative ability of the membrane to permit the flow of solvent while rejecting the passage of salt. The ideal membrane would completely prohibit the flow of salt. Naturally, even with a membrane of perfect selectivity, the process will not be economical if pure water merely trickles through it. The second requirement of adequate flux, therefore, refers to the quantity of pure water flowing through a unit area of the membrane in a certain amount of time. Research to date has been effective in producing membranes with both good selectivity and water flux.

In addition to improvements in membrane properties, new designs for desalination systems have brought economic savings. Some of the most promising commercial systems use bundles of membranes formed into tiny hollow fibers, typically with outside diameters of from 50 to 400 microns and with wall thickness to diameter ratios of from 0.15 to 0.35. These fibers present a tremendously large membrane surface area per volume of equipment and thus, even if the flux or flow per area of the membrane is not the best, the rate of recovery of pure water from the system may at least be acceptable. Although desalination systems using bundles of hollow fibers may actually be used in many specific different designs, the usual one will have the saline water pressurized from about 15 to 1500 p.s.i. or more on the outside of the hollow fibers. Pure water moves through the membrane surfaces and is channeled by the fibers to collection means outside the desalination area.

Because of the high pressures employed and the contamination of product water which might be caused by leaks in the system, membrane seals separating the high pressure areas from the collection zones are critical in all reverse osmosis desalination systems. The formation of seals around the ends of the many little fibers used in a hollow fiber bundle has created special problems. It is to the solution of these particular problems that this invention is directed, although as discussed later, the solution we have found may be applied to the formation of seals in other systems with similar problems.

The usual method of forming the seals on the end of a hollow fiber membrane bundle is shown, for example, in U.S. Pat. 3,442,389 to McLain. A mold is placed around the ends of the hollow fibers and a solidifiable material such as epoxy resin is poured around these ends. After the resin hardens, a cross sectional cut may be made through the resin and mold to expose the fiber ends.

As mentioned in the patent, in order to form an effective seal it is necessary to use a sealant which is fluid enough to completely surround and encapture all the fiber ends in the closely packed bundle. The patent, however, acknowledges that if the sealant is very fluid, there is a tendency for "wicking" to occur. In this phenomenon sealant creeps along the fibers particularly in channels formed between parallel fibers and out onto the active portions of the membrane. "Active portion" refers to that part of the membrane fiber through which reverse osmosis and desalination is effected as opposed to the inactive portions around which the seal is formed and which extend beyond the seal to the product collection means. Unfortunately, sealant which "wicks" onto the active surfaces hardens there and deadens these active areas.

U.S. Pat. 3,442,002 to Geary et al. shows one solution to the problem of wicking—centrifugal casting of the seal. By rotating the fiber bundle during casting and curing of the membrane a centrifugal force is applied outwardly away from the active areas thereby offsetting the forces which cause wicking to occur.

Although the method of Geary et al. may be effective in preventing wicking and localized deadening of active membrane surfaces, the membrane surfaces may still be partially or completely impaired. Most membrane materials are water equilibrated and from the time of their formation to their use they are kept in contact with water; this is particularly true of membranes of cellulose acetate and other cellulose derivatives. However, a problem exists since a satisfactory sealant for high pressure use has not been found for wet fibers. Either the moisture in and on the fiber is not compatible with the sealant, terminating cure, or the bond formed is not strong enough to prevent separation from the fiber as it dries during curing. Attempts to form seals while drying only the ends of the fibers have failed because water wicks from the other membrane areas into the seal. Unfortunately, allowing the membranes to be dried and to remain dry during casting and curing of the seal may permanently affect their osmotic properties.

One previously proposed solution to these sealing problems is a process wherein the active area of the fibers is immobilized with a gel prior to casting the solidifiable sealant around the end of the hollow fibers. While this method has proved satisfactory for small fiber bundles, a problem arises when larger bundles are being sealed due to the tendency of the gel to "wick," that is, travel via the inter-fiber capillaries into the area of the seal. The presence of gel in the area to be sealed greatly reduces the effectiveness of the seal which must be able to withstand the high operating pressures.

SUMMARY OF THE INVENTION

We have now discovered a method of overcoming these problems and it is an object of our invention to improve the method of forming seals on the end of hollow fiber water equilibrated reverse osmosis membranes.

More generally, it is an object of our invention to improve the method of forming seals whereby the "wicking" of sealant from the area being sealed or the wicking of liquids into the seal is prevented.

It is also a general object of our invention to improve the method of forming seals whenever the areas outside the seal are water equilibrated.

We have now found a method for avoiding the previous disadvantages of forming seals for water equilibrated hollow fiber membranes. The essence of the invention is that a distinct separation is formed between dry and wet fiber regions so that the properties of the active membrane areas are not impaired when the inactive membrane regions are dried for seal formation. This result is achieved by applying a secondary, elastomeric seal to the fiber bundle prior to surrounding the active fiber areas with a water immobilizing gel and thereafter forming the primary, high pressure seal on the dry inactive fiber region. The secondary seal serves as an inter-fiber barrier preventing the gel from entering the inactive fiber region and adversely affecting the performance of the primary seal.

DETAILED DESCRIPTION OF THE INVENTION

In carrying out the process of this invention, a bundle of looped hollow fibers is coated with a secondary elastomeric sealant at an appropriate point located near one end of the loop. Preferably the elastomeric sealant is applied during the fiber winding or skeining operation. In this way, there is greater assurance that the sealant will fill the interfiber capillaries and prevent wicking of the gel which is to be applied to the active region of the fiber bundle. However, the elastomeric inter-fiber barrier sealant may also be applied after the fiber bundle is formed, in which case steps should be taken to insure that the sealant is throughly dispersed throughout the bundle.

The material used to form the secondary seal, or inter-fiber barrier must have sufficient viscosity to prevent wicking in the inter-fiber channels. Suitable secondary sealants are polymeric elastomers which have sufficiently low viscosity to coat the fibers and which cure to a higher viscosity after the coating operation. Typical materials are natural and synthetic rubber, urethanes, polysulfides and silicone rubbers. Particularly preferred are the silicone rubbers. With any material, an important selection criteria is that the material does not adversely affect the fibers.

After application of the secondary elastomeric sealant, the looped bundle is pressed together at the points where the elastomer has been applied and one end of the loop is cut resulting in a U-shaped bundle. This bundle of membrane fibers are placed in an appropriate container, such as a tube or cylinder, such that all the fiber ends and most of the elastomeric sealant are exposed. A warm aqueous solution of gelatin or other water immobilizing material is then poured into the container to surround the active membrane surfaces. Thus, the container is filled to a level such that all membrane surfaces that will be in contact with saline solution when the membranes are in operation will be covered by gelatin.

The aqueous gelatin solution is thereafter chilled to solidify the gelatin and immobilize the water surrounding the active membrane area. This may be accomplished, for example, by immersing the container in an ice bath at least up to the level of the solution in the container. The gel solution is continuously chilled and kept in a solid state until after the seal has been cast and has cured.

Following the solidification of the aqueous gelatin solution, the fiber ends are prepared for sealing. This preparation will most likely consist of drying them for a sufficient time to insure that the casting and curing of the seal will not be impaired by retained water. The drying may be accomplished with either air or some inert atmosphere such as nitrogen, carbon dioxide or other gaseous media. While it is essential that the membrane ends are thoroughly dried before casting of the seal, extreme drying conditions should be avoided to prevent the ends from becoming brittle.

The primary seal around the fiber ends is prepared. This may be accomplished, for example, by surrounding the fiber ends with a cylindrical mold which is pressed onto the surface of the fiber ends and the secondary sealant. Subsequently, an epoxy resin or other suitable sealant is poured into the mold onto the exposed surface so that each fiber end is encaptured in resin. Any suitable epoxy resin or other sealant known in the art may be used such as those shown in U.S. Pat. 3,422,008 herein incorporated by reference. The fiber ends extend beyond the sealant.

When this sealant has hardened, the solidified gelatin is removed from around the active membrane surfaces. This may be accomplished by warming the gelatin, removing the gelatin and fibers from the container, and washing the fibers to remove adhered traces of gelatin. The membrane is then ready for use although it may be stored with at least the active membrane areas immersed in water.

While we have described a solution of gelatin as the solidifiable gel material, we also intend to include other materials such as polyglycols, agar solutions, or solutions of sodium silcates, commonly referred to as "water glass."

Finally, the reverse osmosis membranes which may be sealed by our process should not be limited to those which may be used for desalination, but include others suitable for use in the separation of water from electrolyte solutions including sea water, brackish water, acid mine water, and industrial brines and bitterns; the separation of organic liquids; the purification and concentration of liquid foods such as citrus juices, beer, and syrups; and the purification of liquid wastes such as urine. Among the materials useful for hollow fiber reverse osmosis membranes are cellulose esters, such as cellulose acetate, cellulose ethers, polyamides, polyesters, polyolefins and the like.

EXAMPLE

A seal was formed as follows on a looped hollow fiber bundle containing 5000 filaments of reverse osmosis fibers with an outside diameter of 300 microns.

The bundle, coated near one end with RTV 3140 silicone rubber (Dow Corning), was pulled into a one inch pipe which was thereafter sealed at one end with a conventional threaded fitting. About 10 inches of fiber and a portion of the elastomeric sealant remained exposed at the other end. A warm aqueous gelatin solution (2.8 wt. percent) was pumped into the pipe and then chilled to solidify the gelatin. The exposed fiber ends were then dried in warm air while continuing to chill the gelatin. Finally, a primary epoxy sealant was cast onto the fiber ends and a portion of the cured elastomeric sealant layer with the seal mold surrounding the pipe. After the primary seal cured, the threaded fitting was detached and the gelatin easily removed by heating and flushing with water.

The hollow fiber bundle and seal were tested in reverse osmosis desalination. At all pressures up to 1200 p.s.i. there were no leaks and reverse osmosis properties were not impaired by seal formation.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for the manufacture of a high pressure seal around a bundle of water equilibrated hollow fiber reverse osmosis membranes having an active area comprising:

forming an inter-fiber barrier by coating the fibers with an elastomeric sealant material proximate one end of the bundle, placing the bundle in a container such that all the fiber ends and most of the elastomeric sealant are exposed above said container, pouring a water immobilizing gel into said container to surround the active area of said fiber bundle with said gel, drying the fiber ends at said proximate end of the bundle for a sufficient time to insure that the subsequent casting of the seal will not be impaired by retained water, and thereafter casting a solidifiable primary sealant only upon said elastomeric sealant and around the end of the said water equilibrated hollow fiber membranes so that no primary sealant contacts the active area.

2. The process of claim 1 wherein said water immobilizing gel is solidified gelatin solution.

3. The process of claim 1 wherein said solidifiable primary sealant is epoxy resin.

4. The process of claim 1 wherein said elastomeric sealant is a silicone rubber.

5. A process for the formation of a high pressure seal around the end of a bundle of water equilibrated hollow fiber reverse osmosis membranes having an active area comprising:

forming an inter-fiber barrier by coating the fibers with an elastomeric sealant material proximate one end of the bundle, whereby the inter-fiber passage of liquid is prevented, placing the bundle in a container such that all the fiber ends and most of the elastomeric sealant are exposed above said container, pouring an aqueous solution of gelatin into said container so as to surround the active area of said fiber below said elastomeric sealant, chilling said solution to solidify said gelatin, drying the fiber area at said proximate end of the bundle, casting a solidifiable primary sealant only around said end of said fiber and at least a portion of said elastomeric sealant so that no primary sealant contacts the active area, curing said solidfiable primary sealant, and removing said solidified gelatin solution from around said active fiber area.

6. The process of claim 1 wherein said solidifiable sealant is epoxy resin.

7. The process of claim 5 wherein the elastomeric sealant is a silicone rubber.

8. A process for the formation of a high pressure seal around the end of a bundle of water equilibrated hollow fiber reverse osmosis membranes having an active area comprising the steps of:

coating a bundle of looped hollow fibers at an appropriate point located near one end of the loop with an elastomeric sealant material so as to form an inter-fiber barrier, pressing the looped bundle together at the points where the elastomer has been applied, cutting one end of the loop to form a U-shaped bundle, placing said bundle in a container such that all the fiber ends and most of the elastomeric sealant are exposed above said container, pouring a water immobilizing gel into said container to surround the active area of said fiber below the fiber ends and said elastomeric sealant, drying the fiber ends for a sufficient time to insure that the subsequent casting of the seal will not be impaired by retained water, casting a solidifiable primary sealant only around said ends of said fiber and at least a portion of said elastomeric sealant so that no primary sealant contacts the active area, curing said solidifiable primary sealant, and removing said water immobilizing gel from around said active fiber area.

9. The process of claim 8 wherein said water immobilizing gel is selected from the group consisting of gelatin, polyglycols, agar solutions and solutions of sodium silicates.

10. The process of claim 9 wherein said water immobilizing gel is solidified gelatin solution.

11. The process of claim 9 wherein said solidifiable primary sealant is epoxy resin.

12. The process of claim 9 wherein said elastomeric sealant is a silicone rubber.

References Cited

UNITED STATES PATENTS

| | | | |
|---|---|---|---|
| 3,442,389 | 5/1969 | Mendelson | 210—491 X |
| 3,522,885 | 8/1970 | Lavender et al. | 210—321 |
| 3,442,002 | 5/1969 | Geary, Jr., et al. | 210—321 |

ROBERT F. WHITE, Primary Examiner

A. M. SOKAL, Assistant Examiner

U.S. Cl. X.R.

264—254, 265, 277; 210—321, 491